Dec. 6, 1960  H. BLACKSTONE  2,963,542
SCANNER-RECORDER
Filed June 13, 1958
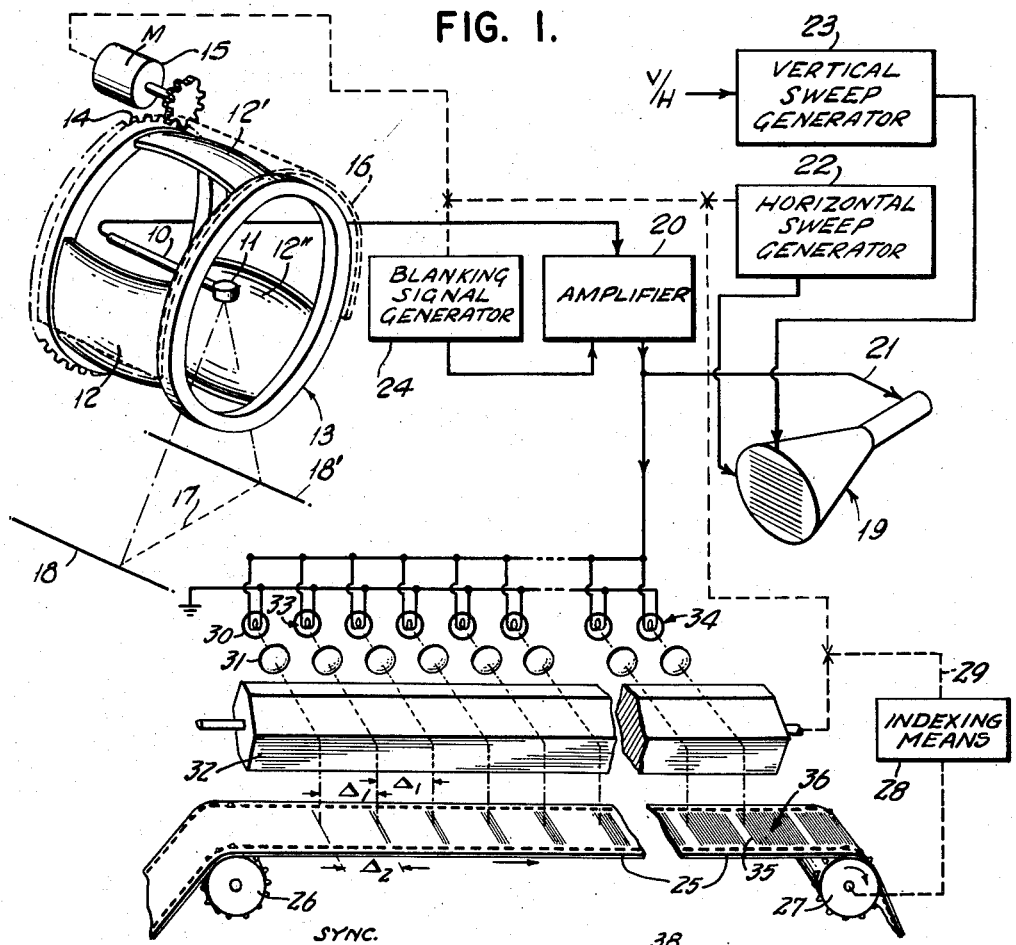
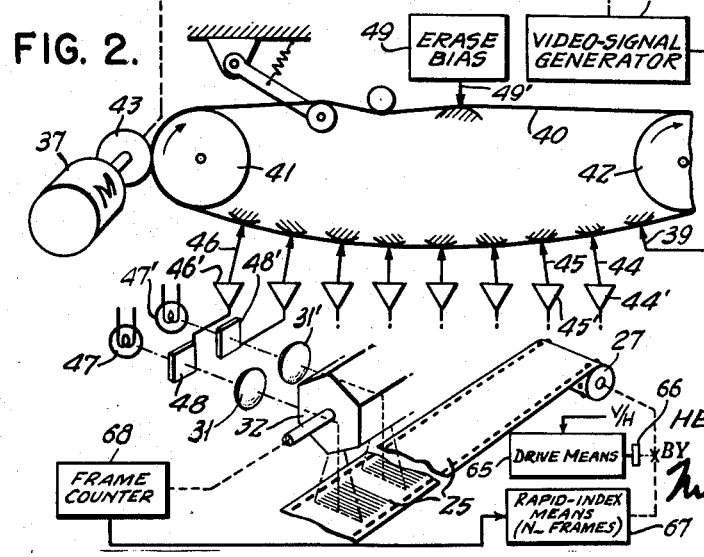
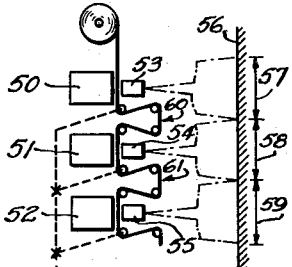
INVENTOR.
HENRY BLACKSTONE
BY
Mitchell & Bechert
ATTORNEYS United States Patent Office 2,963,542
Patented Dec. 6, 1960

2,963,542

SCANNER-RECORDER

Henry Blackstone, Syosset, N.Y., assignor to Servo Corporation of America, New Hyde Park, N.Y., a corporation of New York Filed June 13, 1958, Ser. No. 741,877

13 Claims. (Cl. 178—6.7)

My invention relates to means for automatically storing line-video information and for transcribing and displaying such information. My invention is of particular application to automatic scanning mechanisms for continuously scanning a field of view, and in particular to those in which the intelligence from a plurality of scanned lines in the field is to be integrated into a display frame. The present invention incorporates improvements over and modifications of the invention disclosed in the copending application of Henry Blackstone and Frank G. Willey, Serial No. 320,272, filed November 13, 1952, and in my copending application Serial No. 394,346, filed November 25, 1953, now Patent No. 2,860,179, issued November 11, 1958.

In scanning mechanisms of the class described in said copending applications, the number of lines of scanned intelligence available at a time is limited by the number of sensitive elements, and if the intelligence is to be instantaneously available as a frame of successive lines, then one must either make a permanent record of all scanned lines, as on a moving film or on a moving paper-strip record, or one must employ a long-persistence device, such as a cathode-ray oscillograph, to develop a full frame of intelligence and to transiently retain such frame for interpretation. In the latter case, the frame presentation must be periodically indexed because, to develop the frame, one component of beam deflection, i.e. that transverse to the scan-line presentation, must be depressed, and, of course, this depression will ultimately progress off the face of the oscillograph. This periodic indexing of frames presents a serious handicap to the interpretation of the scanned information.

For purposes of later analysis of recorded full frames of intelligence, it often occurs that the frame-repetition rate is not sufficient for accommodation in motion-picture projectors, and furthermore the recorded frames are each totally different, so that little integration results from attempting to utilize motion-picture-projection techniques.

It is, accordingly, an object of my invention to provide improved display means for scanners of the character indicated.

It is another object to provide an energy-storing device in combination with scanners of the type indicated and capable of not only storing at all times the video intelligence developed by the scanner over a given plurality of most recent line scans, but of also creating fully integrated frame records of such nature that motion-picture techniques may be employed for projection and later analysis of the frame data.

More specifically, it is an object to provide in conjunction with scanning and storage devices of the character indicated, means whereby a photographic-strip record representing a frame containing a plurality of scan lines of video information (or whereby a plurality of frames containing such information) may be so projected and continuously progressed that the projected display may realistically duplicate the appearance of a fully integrated elongated strip record of the stored video information, said projection moving over the projection area and on a continuous basis, whereby jitter may not degrade the interpretation of the projected image.

For one specific application of the invention, it is an object to meet the above objects for the case of aerial-reconnaissance devices of the type described in said copending applications, the appearance and the ultimate display being one of a greatly elongated window generally aligned with the flight axis, and the integrated scanned field appearing to migrate across the display as the aircraft covers the terrain beneath.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Fig. 1 is a diagram schematically indicating electrical, mechanical, and optical parts of mechanism of the invention;

Fig. 2 is a similar diagram illustrating alternative components; and

Fig. 3 is an optical diagram of a projection system for a recording created by the mechanism of Figs. 1 or 2.

Basically, my invention contemplates the employment of a video-storage device capable of accommodating at any one time a sufficient number of successive scanned lines of video intelligence to produce a display frame. A video-signal generator continuously delivers line-video signals to the storage device; such generator may be a scanner of the type disclosed in said applications. The storage device includes photographic frame-recording means, so devised that, for each new line of input information, a new fully recorded frame is created on photographic film; said frame comprises a plurality of lines, and, preferably, the dimensions of the frame on the photographic film are such as to be accommodated in standard motion-picture-projection equipment. The arrangement of the storage device is such that it will store the latest full frame of intelligence, commencing always with the latest developed scan line and extending always for the full number of lines per frame. The photographic frames thus are each characterized by all the desired number of lines per frame, the only difference between one recorded frame and the next adjacent recorded frame being a migration of the image by one line in the frame, said line being represented by acceptance of the latest incoming line of information, and by dropping of the oldest stored line of information.

Referring to Fig. 1 of the drawings, my invention is shown in application to line-scanning means of the type disclosed in greater detail in said copending patent applications. Such scanning means may comprise a support 10 fixedly carrying energy-responsive means 11. Collecting optics, including a plurality of mirrors 12—12'—12", may be mounted on a scanner ring or drum 13 journalled (by means not shown) in relation to the support 10 for rotation about and focused on the energy-responsive means 11. Peripheral gear means 14 may be driven by a motor 15 to produce continuous unidirectional scanning action. For the configuration shown, that is, with three collecting mirrors spaced equally about the scanner axis, the angular field of view for directly utilizable intelligence is substantially 60 degrees, and a peripheral shield (suggested by the dashed outline 16) fixed with respect to the support means 10 may serve to screen the scanner for energy not needed for coverage of the optically scanned field.

As pointed out in said applications, scanners of the character indicated may be employed as aids for aerial reconnaissance and in such case, the scanned field of view is preferably downward, with the scan axis aligned with the flight axis so as periodically to develop a lateral scan line 17 between limits 18—18' on the ground.

As further pointed out in said applications, display means, which may include a cathode-ray oscillograph 19, may develop a frame presentation for a plurality of successive scan lines produced by a described scanner, relying on the persistence characteristics of the tube 19 to preserve the frame development. In such case, signal-processing means including amplifier means 20 may respond to the output of the energy-responsive means 11 to provide signals for intensity-modulation (at 21) of the tube 19. Horizontal-sweep signals may be provided by a generator 22, and vertical-sweep or step-function signals by a generator 23; the horizontal sweep is synchronized with the line-scanning frequency, as suggested by the dashed connection to motor 15, and the vertical-sweep amplitude is governed by the velocity-altitude function (hereinafter called the V/H rate) of the aircraft, as suggested by legend applied to a control symbol for generator 23.

It is a property of line scanners of the character indicated that the video output of the scanner is represented by substantially equal periods of utilizable and of non-utilizable intelligence. In order that the output amplifier 20 may be characterized only by the utilizable part of the video cycle, I provide a blanking-signal generator 24 synchronized with the scan period and in gain-controlling relation with the amplifier 20. Thus, the output of amplifier 20 will be characterized by a period during which directly utilizable video intelligence is available, followed by a substantially equal blanking period, involving no signal.

In accordance with the invention, I provide means for effectively storing the video output of amplifier 20 in a manner to create a full frame of stored video data for each new input line scanned at 17. The arrangement is such as to produce a photographic record by exposure of film 25, there being a full frame of recorded data completed for each new line of input information. Film-supporting means is shown to comprise two sprocket spools 26—27, one of which, say the spool 27, may also form part of the film-transporting mechanism, as shown by the dashed connection to transport means 28; I prefer periodically indexed transportation rather than continuous movement of the film 25, the amount of index being one full frame length for each indexing operation. The dotted line 29 suggests synchronization of the indexing means 28 with the scan-line period, so that the film 25 is indexed to a new frame position for each new input line of information.

The means for exposing the film 25 to recording modulations is, in the form shown, a battery of similar optical projectors, each comprising a light source 30, a projection lens 31 and a rotating mirror polygon 32, oriented to produce scanning transversely of the film; all light sources are energized simultaneously by the video output of amplifier 20. The projection systems 30—33 . . . 34 are provided in plurality corresponding to the number of lines per frame, and because of their similarity, I show the mirror polygon 32 as a single element serving all projection systems in common. Polygon 32 is oriented with its axis of rotation parallel to the strip of film 25, on which the recording is to be made, and the rate of rotation of polygon 32 is synchronized with the basic time base of input information, in such manner as to present a new polygon face to the battery of projectors 30—33 . . . 34 for each new line of input information.

The preferred separation $\Delta_1$ between adjacent axes of the optical projectors 30—33 . . . 34 differs from the frame separation $\Delta_2$ by a small amount, representing the desired line separation in the ultimately exposed frames. Thus, with each indexing of the film 25 by the frame separation $\Delta_2$, each successive projector 30—33 . . . 34 will add a line to the progressively developed exposed frame. The lines will be added in properly integrated relation, and upon exposure at system 34, there will be completed the last line 35 of a frame 36; and there will be a new such completed frame 36 for each new input line of video signal at 17.

The arrangement of Fig. 2 generally resembles that of Fig. 1, except that a loop 40 of storage material is employed; loop 40 may be magnetic tape, supported between spaced drums or pulleys 41—42. Drive is supplied continuously by the motor 37, by way of a friction wheel 43 applied against the pulley 41. The block 38, labeled video-signal generator, will be understood to suggest the scanner and amplifier 20 of Fig. 1, so that video signals are continuously applied at 39 to tape 40. Separate pick-off elements 44—45 . . . 46 are equally spaced and by amounts corresponding to the time base of the input information, synchronization with the scan rate being suggested by a suitably labeled dashed connection to motor 37. An erase-bias source 49 and head 49' serves continuously to clean the tape for recycled use. Separate amplifiers 44'—45' . . . 46' are associated with the respective pick-off circuits, but instead of directly modulating the light sources 47—47' associated with the projection systems, I show individual connection of such amplifiers, such as at amplifier 46', to individual light-modulating elements (48—48') incorporated as a part of each projection system.

Inasmuch as each optical system 47—48, 47'—48', etc. in Fig. 2 is supplied wtih all lines of video signal, it is possible to simultaneously develop on film 25 a plurality of complete frames, said plurality corresponding to the number of pick-off elements 44—45 . . . 46. In such circumstance the spacing of adjacent optical axes should be the ultimate photo-projection frame spacing $\Delta_2$ (and not $\Delta_1$, as in Fig. 1). I show drive means 65 connected to the film-advance sprocket 27 via a slip clutch 66, and a control connection labeled V/H will be understood to suggest that the continuous or intermittent advance rate of film 25 may be governed in accordance with the velocity-altitude function of the aircraft so as to develop correct dimensional proportions in the photographic frames.

After a lapse of time corresponding to that required to scan the number (N) of lines per recorded frame, drive means 65 will have advanced film 25 only enough to create a frame (i.e. just short of one frame height), but N frames will have been exposed and thus "loaded" onto the film. Therefore, at completion of every N line, it is necessary to rapid-index the film 25 by an amount corresponding to N-frames, so that unexposed film can be placed in proper orientation with all the recording projection systems. Rapid-indexing may be effected by means 67 during the blanking interval following every Nth incoming video line (at the output of generator 38). In order that rapid-indexing may be adequately synchronized, I show frame-counting means 68 operating from the shaft of polygon 32 and serving to count the passage of N polygon faces before triggering the rapid-index means 67.

Regardless of whether film 25 is exposed by the apparatus of Fig. 1 or by that of Fig. 2, each successive recorded frame 36 will differ from the preceding recorded frame only by the migration of one line; a motion-picture projection of all recorded frames is thus possible. The appearance of such projection will be one of looking through a limited window and watching the field migrate with respect to the window frame. For the case of aerial-reconnaissance data recorded in the manner described, the appearance will be one of observing continuous migration of the scanned topography through the window frame.

In certain applications, it may seem unduly limiting to project merely single frames from the film 25, as by utilizing but one conventional motion-picture equipment. Of course, the single frame defines a limit for interpretation, and the utmost integration of stored information on the film is not achieved. For still better integration of the available information, I provide a battery of motion-picture projectors, employing intermittent film-advance mechanism (not shown in detail), but otherwise schematically shown in Fig. 3 to include light boxes 50—51—52 and optics 53—54—55. All projecting optics 53—54—55 are oriented to project images on the same projection surface 56, the arrangement being such that the longitudinal limits or spread 57 of the display for optics 53 shall be immediately adjacent, and therefore apparently continuous with, the limits or spread 58 for the optics 54. In like manner, continuity of projections for the spread 59 of optics 55 with the spread 58 for optics 54 may also be achieved.

The same film 25 may be utilized in the projectors 50—51—52 as was exposed by the apparatus of Figs. 1 or 2, but to produce effective continuity of the projected images, means must be provided whereby, at any one time, adjacent projectors 50—51 are projecting frames spaced by the number of lines per frame; the same projection-frame spacing will hold true for the case of projectors 51—52. Systems of pulleys 60—61 between adjacent projectors accommodate such lengths of film as are not needed at any one instant, and the drive means for all projectors is preferably synchronized, as suggested by the common drive 62.

In use, with all projectors 50—51—52 operating the same frame rate (which may be a standard motion-picture frame rate), the ultimately displayed image on the surface 56 will appear continuous and will create the impression of looking through a very greatly elongated window, through which migration of the greatly elongated projected image may be continuously viewed. In this manner, utmost integration of the stored information is achieved, and there is no degradation occasioned by jitter.

It will be seen that I have described an improved video display and recording device. In application to aerial reconnaissance, the device may be considered as an attachment or adjunct to scanners of the type described in said copending applications, enabling simplified reproduction and better analysis of the recorded data. Photographic film provides a compact means of storing the information, and techniques for the rapid processing and reproduction thereof are well established. In Fig. 2, the loop 40 of storage material need not be bulky, and since it is continuously recycled, there is utmost economy of materials. Records created on film by my apparatus are useful for training purposes or for analysis, and the creation of strip maps of any desired length is facilitated with film recordings such as my equipment is inherently able to produce. For example, an elongated strip print of any desired length may be made by starting with one frame 36 of my film 25 and by printing immediately adjacent thereto such frame, taken N frames distant, where N is the number of lines per frame.

While I have described the invention in detail for the preferred forms shown, it will be understood that modifications may be made within the scope of the invention as described in the claims which follow.

I claim:

1. A system for recording frames of information, one line at a time, on photographic film, comprising a plurality of spaced optical projection systems corresponding in number to the number of lines of a frame, the distance between adjacent projection axes being equal to the difference between a frame length and the distance between adjacent lines, means for supporting said photographic film so that a given length of film lies in the field of projection of said optical systems, means for simultaneously scanning the projection axes of all said optical systems across said film and transversely to the direction of film movement, each complete scan producing a line of information on said film, means for advancing said film one frame at a time after the scanning of each line until a complete frame of information is produced, and means for synchronizing said scanning means with said film advancing means so that immediately after a line is scanned, the film is advanced one frame for the scanning of a successive line, whereby successive frames contain an increasing number of lines and a complete frame is recorded by the last optical system.

2. A system for recording frames of information, one line at a time, on photographic film, comprising a plurality of spaced optical projection systems corresponding in number to the number of lines of a frame, the distance between adjacent projection axes being equal to the length of a frame, means for supporting said photographic film so that a given length of film lies in the field of projection of all said optical systems, means for simultaneously scanning the projection axes of all said optical systems across said film and transversely to the direction of film movement, each complete scan producing a line of information on said film, film advancing means including a first means for advancing the film one line at a time until all the frames in the field of projection are completed, the frames being completed simultaneously by the plurality of projection systems, and a second rapid index means for transporting the completed frames out of the field of projection and a new length of film into the field of projection.

3. In combination, a video-signal generator delivering line-video signals characterized by a periodically recurring time base, photographic film supporting and advancing means, a plurality of spaced optical-projecting systems including means for simultaneously scanning the projection axes thereof across a length of film carried by said supporting and advancing means, said projection systems including modulating means responsive to the output of said generator, means for simultaneously modulating all of said projecting systems with the same video signal said scanning means being oriented with respect to the direction of film movement so as to cause said axes to scan transversely of film movement, and the spacing between adjacent projection axes differing from the exact frame spacing by substantially the spacing between adjacent lines in any particular frame.

4. In combination, a video-signal generator delivering line video signals characterized by a periodically recurring time base, video storage means connected to said generator and synchronized with said time base for storing a plurality of successive lines of the video signals, separate output connections for delivering the stored video signals in time sequence, the delay between adjacent outputs being equal to said time base, and photographic frame-recording means including film-supporting means synchronized with said time base, said frame-recording means further including means separately recording the individual video signals of each of said outputs on corresponding separate successive frames along a length of film whereby as the film advances, successive frames are exposed to more lines, and whereby a recorded frame is completed after the film has advanced the last of said separate recording means.

5. In combination, a video signal generator delivering line video signals having a periodically recurring time base, video storage means connected to said generator and synchronized with said time base, said storage means including means for storing a plurality of successive lines of said video signals and separate output connections delivering variously delayed stored video signals, the delay increments between said outputs being a function of said time base, and photographic frame-recording means including film-supporting means synchronized with said time base, said photographic recording means including separate optical projectors, one for each of said storage outputs, and means for modulating said projectors with the video signals delivered by the respective output connections of said storage means.

6. The combination of claim 5, in which each projector includes a constant light source and separate means for modulating the light intensity from said source, the modulating connections to said individual output connections being to said light-modulating means.

7. In combination, a video signal generator delivering line video signals having a periodically recurring time base, video storage means connected to said generator and synchronized with said time base, said storage means including means for storing a plurality of successive lines of said video signals and separate output connections delivering variously delayed stored video signals, the delay increments between said outputs being a function of said time base, and photographic frame-recording means including film-supporting means synchronized with said time base, said last-defined means including an elongated mirror polygon mounted for rotation on an axis parallel to a stretch of film supported by said last-defined means, the elongation of said polygon corresponding to a plurality of frames representing the number of lines per frame, means synchronizing rotation of said polygon with said time base, and separate optical projectors, each separately modulated by a different output of said storage means, and utilizing said polygon as a common element to project separate video line data on each of successive frames along the length of said mirrow polygon.

8. In combination, a video signal generator delivering line video signals having a periodically recurring time base, video storage means connected to said generator and synchronized with said time base, said storage means including means for storing a plurality of successive lines of said video signals and separate output connections delivering variously delayed stored video, signals, the delay increments between said output being a function of said time base, and photographic frame-recording means including film-transporting means synchronized with said time base, said film-transporting means including a frame-indexing mechanism for said film, one frame for each recurrance of said time base, and separate optical projectors, each intensity-modulated by a different output of said storage means and each aligned with respect to an elongated stretch of film to expose a different line on adjacent frames with different stored line output for each recurrence of said time base.

9. The combination according to claim 8, in which the spacing between adjacent projection axes of said optical projectors is substantially equal to the frame spacing on said film and the distance between a pair of adjacent lines.

10. In combination, a video signal generator for delivering line video signals having a periodically recurring time base, video storage means including an endless loop of energy-storing material, means driving said loop in synchronism with said time-base, the length of said loop being such as to accommodate at one time a plurality of lines of video signals, means connected to said generator for continuously applying line video signals on said storage material, and a plurality of pick-off elements distributed along the length of said loop by amounts representing said time base interval, whereby at any one instant of time, a plurality of successively delayed lines of video signals is available at said pick-off elements.

11. The combination according to claim 10, and further comprising a plurality of projection systems coupled respectively to said pick-off elements and operative in response to an output therefrom, photographic film, means for positioning said film so that a given length thereof lies in the field of projection of all said projection systems at any one instant of time, means for advancing said film in synchronism with said time base and in a direction transverse to the scan of the projection axes, whereby a plurality of frames is recorded simultaneously by said projection systems.

12. The combination according to claim 11, wherein said storage material is magnetic tape.

13. A photographic system for projecting film on a screen, the film containing a plurality of frames, each frame consisting of a plurality of scan lines, and each frame differing from a successive frame by a line of information, said system comprising a plurality of projectors, and means for feeding the film into the projectors so that adjacent projectors are simultaneously projecting frames separated by the number of lines on a frame.

References Cited in the file of this patent

UNITED STATES PATENTS

| | | |
|---|---|---|
| 1,990,544 | Gray | Feb. 12, 1935 |
| 2,160,951 | Alice | June 6, 1939 |
| 2,420,029 | Brady | May 6, 1947 |